June 6, 1950            L. S. WILLIAMS            2,510,536
ELECTRIC MOTOR SERVO MECHANISM
Filed Sept. 27, 1946
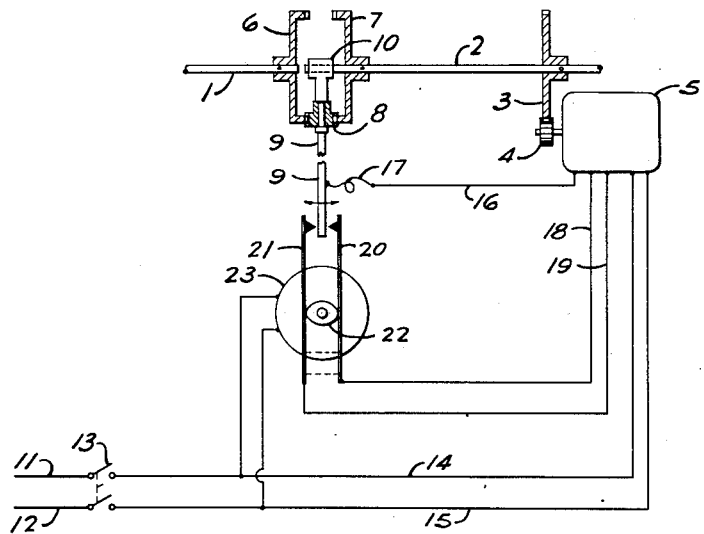
Fig. I
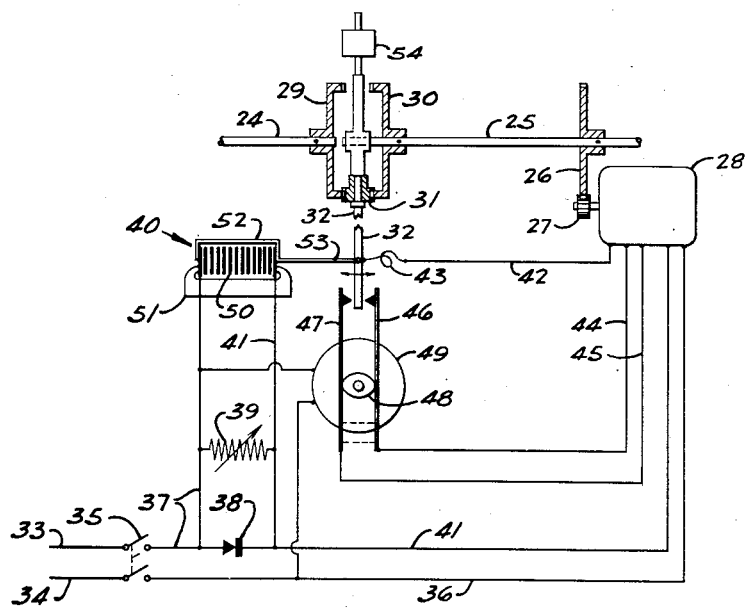
Fig. II
INVENTOR.
Lawrence S. Williams
BY
Marshall and Marshall
ATTORNEYS Patented June 6, 1950

2,510,536

UNITED STATES PATENT OFFICE 2,510,536

ELECTRIC MOTOR SERVO MECHANISM

Lawrence S. Williams, Toledo, Ohio, assignor to Toledo Scale Company, Toledo, Ohio, a corporation of New Jersey Application September 27, 1946, Serial No. 699,776

3 Claims. (Cl. 318—32)

1

This invention relates to servomechanisms and in particular a simple switching method for modulating the torque developed by an electric motor according to the force or load that the motor must overcome.

One of the problems encountered in the design of any servomechanism is that of securing adequate stability under all conditions of use. Stated in other words, the driving motor supplying the power to move a load shall not drive the load beyond the position determined by the input signal or controlling device. In some applications of servomechanisms it is permissible to allow the motor to oscillate a few times while positioning the load provided that the oscillations die out rapidly. In more exacting applications of servomechanisms it is imperative that the motor shall drive the load to but not beyond the position determined by the input signal, i. e. that the system shall be accurate, deadbeat and free of oscillation. To achieve satisfactory operation of a servomechanism, particularly if the load has considerable inertia, it is necessary to continuously control the power input to the motor and to decrease the power input in a more or less continuous manner as the motor approaches synchronism with the input signal.

The principal object of this invention is to control the operation of an electrically driven servomechanism by rapidly opening and closing the motor control circuits and varying the proportion of closed to open time according to the torque to be exerted by the motor.

Another object of the invention is to supply an electrically driven motor of a servomechanism with a retarding force that varies in generally inverse proportion to the departure from synchronism of the input signal and driven load and to simultaneously supply the motor with intermittent driving impulses whose duration is generally proportional to the difference in synchronism between the driven load and the input signal.

Another object of the invention is to control the speed and torque of a shaded pole electric motor by supplying the field thereof with an electrical current having alternating and direct components and intermittently closing its shading coil circuits to determine the direction of rotation and the strength of the power impulses.

A still further object of the invention is to provide a control system for an electrically driven servomechanism which control system reacts mechanically on the input to the servomechanism so that the operation of the mechanism may be "felt" at the input of the servomechanism.

2

The invention consists in a servomechanism including an electric motor for maintaining synchronism between a signal and a load while supplying power to the load, the servomechanism including a pair of contacts that are cyclically operated for determining lack of synchronism and for supplying power pulses to the motor which power pulses are proportioned in duration to the lack of synchronism that is to be corrected by the motor.

Examples of servomechanisms embodying the invention are shown schematically in the accompanying drawings.

In the drawings:

Figure I is a schematic illustration of one form of the invention.

Figure II is a schematic illustration showing a more complete method of control of a servomechanism.

These specific figures and the accompanying description are intended merely to illustrate the invention but not to impose limitations on the claims.

As illustrated in Figure I, an input or signal shaft 1 is axially aligned with an output shaft 2 that is connected through a spur gear 3 and a pinion 4 to a motor 5 supplying power to the output shaft 2 to keep it synchronized with the input shaft 1. The adjacent ends of the input shaft 1 and the output shaft 2 are fitted with crown gears 6 and 7 that mesh with a pinion 8 rotatably journaled on an arm 9 which extends transversely from a bearing 10 carried on the output shaft 2 between the crown gears 6 and 7. The crown gears 6 and 7 and the pinion 8 form, in effect, a differential mechanism in which the bearing 10 and the arm 9 correspond to the carrier. If the input shaft 1 is turned clockwise through a given angle and the output shaft 2 is turned counterclockwise through a similar angle the pinion 8 will rotate on its axis but its axis, the arm 9, will not be rotated in space around the output shaft 2. If, on the other hand, the input shaft 1 is rotated while the output shaft 2 is held stationary the pinion 8 will turn on its axis and at the same time carry the arm 9 through an angle that is equal to half the angle through which the input shaft 1 turned. In general, the rotation of the arm 9 around the axis of the shafts 1 and 2 is equal to half the difference of the angles through which the input shaft 1 and the output shaft 2 are turned and thus the position of the arm 9 may be used to indicate the condition of synchronism between the input and output shafts.

Power from an alternating current source connected to leads 11 and 12 is fed through a two-pole disconnect switch 13 and leads 14 and 15 to the field of the motor 5. The motor 5 is of the conventional shaded pole variety in which a rotating magnetic field for driving a squirrel cage rotor is produced by the action of a single phase current in a driving coil and the flux retarding influence of shading coils embracing portions of the pole faces of the motor field. In the motor 5 two sets of wound shading coils are employed and the leads are brought out so that the direction of rotation of the motor may be selected by closing the circuit of one or the other of the shading coils. If both coils are simultaneously closed they neutralize each other and the motor stops. One lead from each of the shading coils is connected to a lead 16 that, through a flexible conductor 17, is connected to the arm 9. The other ends of the shading coil windings are connected to leads 18 and 19 which lead to leaf spring contacts 20 and 21. The arm 9 is loosely held between the contacts 20 and 21 and is driven against one or the other of the contacts as soon as a lack of synchronism between the input shaft 1 and output shaft 2 occurs. The current that flows through the arm 9 and the engaged contact 20 or 21 and the shading coil connected thereto produces power impulses in the motor 5 that drive the output shaft 2 in a direction to synchronize it with the input shaft 1 and in so doing move the arm 9 away from the engaged contact.

If no further control is employed with the motor the system "hunts" badly because the motor is fully energized as long as the arm 9 is in contact with either of the contacts 20 or 21 and the momentum accumulated by the motor during this time interval causes it to overrun and drive the arm 9 against the other contact to stop and reverse the motor. However, the second contact is still closed when the motor stops and the motor starts up again in the opposite direction and drives the arm 9 away from the second contact and against the first. Under most conditions this rapid reversing continues indefinitely unless the contacts are separated far enough to permit the frictional load on the motor to stop it with the arm 9 between the contacts.

This condition may be remedied by imparting a vibratory motion to the contacts 20 and 21 so that the power to the motor is gradually reduced as synchronism between the input shaft 1 and the output shaft 2 is approached. One method of securing this result is to interpose an elliptical cam 22 between the spring contacts 20 and 21 and rotating the cam 22 with a constant speed motor 23. The cam 22 may be driven either at motor speed or at a submultiple of that speed depending upon the speed of response required in the servomechanism. It is also desirable that the motor 23 be of the synchronous type so that the opening and closing of the contacts 20 or 21 may be properly phased with respect to the field excitation of the shaded pole motor 5. This phasing is desirable because the currents that flow in the shading coils are induced by transformer action from the current in the field coil of the motor. Therefore, to secure maximum current flow in the shading coil the contact must be closed at the same time that voltage is generated in the shading coil.

The movement of the leaf contacts 20 and 21 by the action of the cam 22 causes the duration of contact between the arm 9 and either of the contacts to vary according to the position of the arm 9. Thus, if a large error exists the arm 9 may deflect the engaged contact to such an extent that the cam 22 no longer acts on that spring leaf and the contact is consequently continuously closed. In this event the motor is fully energized and operates at maximum power or speed as may be required to drive the output shaft 2. As synchronism is approached and the arm 9 approaches a neutral position the contact is intermittently closed and the torque of the motor is reduced. If the load has sufficient friction in comparison with its inertia, this type of control is satisfactory because the motor speed will be reduced by the friction as soon as the power input to the motor is reduced.

If the load has a large inertia component in comparison to its friction the inertia of the load causes the servomechanism illustrated in Figure I to overrun and to hunt. To overcome this the motor must be supplied with a braking torque that preferably is generally inversely proportional to the lack of synchronism between the input shaft and the output shaft. This braking torque may be secured by any of several methods. A simple method is illustrated in Figure II.

In this example an input or signal shaft 24 is shown in alignment with an output shaft 25 which is driven through gears 26 and 27 from a shaded pole induction motor 28. A differential mechanism comprising crown gears 29 and 30, a pinion 31 meshing with the crown gears and a carrier or arm 32 journaling the pinion 31 serves to indicate the synchronism or lack of synchronism between the input or signal shaft 24 and the output shaft 25. The main field of the motor is energized from an alternating current power source connected to lines 33 and 34 which through a double pole disconnect switch 35 are connected to leads 36 and 37. The lead 36 is connected directly to the motor 28, while the lead 37 is connected through a parallel arrangement of a half wave rectifier 38, an adjustable resistance 39, and a pressure sensitive resistor 40 to a lead 41 connected to the main field of the motor 28.

The common connection between the shading coils of the motor is brought out to a lead 42 which through a flexible connection 43 is electrically connected to the arm 32. The other ends of the shading coils are connected through leads 44 and 45 to spring leaf contacts 46 and 47 that engage opposite sides of the arm 32 and limit its travel in response to lack of synchronism between the input shaft 24 and the output shaft 25. The spring leaf contacts 46 and 47 are vibrated by an elliptical cam 48 driven by a synchronous motor 49. The cam 48 may be driven either at motor speed or at some submultiple of that speed. As in the preceding example the vibration of the spring leaf contacts 46 and 47 serves to modulate the power impulses of the motor according to the lack of synchronism between the input and output shafts.

The pressure sensitive resistor 40 consists of a series of carbon disks 50 that are loosely held in an insulating C-shaped clamp 51. If no external force is applied to the disks their resistance to current flow is high. An insulated C-shaped arm 52 connected through a link 53 to the arm 32 embraces the stack of disks 50 and serves to apply force to the stack of carbon disks 50 according to the deflection of the arm 32 from its neutral position. The opening of the C-shaped bracket 52 may be made equal to the opening of the C- shaped clamp 51 if the resistor is to be sensitive to small movements of the arm 32. If it is desirable to have a "dead zone" the opening of the C-shaped bracket 52 may be made greater than the opening of the clamp 51 so that some movement of the arm 32 is required before the carbon disks 50 are compressed.

The half-wave rectifier 38 connected between the leads 37 and 41 causes the motor 28 to be energized with an electrical current that has both alternating and direct components. The alternating components in combination with the shading coils produce a rotating magnetic field serving to drive the rotor. The direct current component generates a braking torque in the motor that serves to govern the speed of the motor and to stop the motor quickly when the alternating current component is discontinued. When the rectifier is acting alone and not partially bypassed by the pressure sensitive resistor 40 while one of the shading coil circuits is continuously closed, the motor operates at approximately 5 per cent of its normal speed. When the pressure sensitive resistor 40 is connected parallel to the rectifier and pressure is applied to it to increase its conductance it by-passes current around the rectifier and by thus increasing the ratio of alternating to direct current in the motor increases the speed of the motor and decreases the braking effect. The adjustable resistor 39 connected in parallel with the rectifier 38 and the pressure sensitive resistor 40 permits the minimum speed and the braking torque of the motor to be adjusted according to the load being driven.

In each of these examples the torque developed by the motor is generally proportional to the duration of contact of the leaf springs and in the second example to the pressure applied to the pressure sensitive resistor 40. Since the output shafts 2 or 25 are connected to the motors 5 or 28, respectively and to the load being driven they may be considered as fixed insofar as the force required to operate the spring contacts is concerned. Thus the input shafts 1 or 24 must supply sufficient torque to drive the differential arms 9 or 32 against the contact springs and, in the case of the arm 32, against the pressure sensitive resistor 40. Since this required force is generally proportional to the torque of the motor the operation of the servomechanism may be "felt" by the resistance to movement of the input shaft. In many applications this "feedback" of force is desirable because it qualitatively gives the feel of a direct acting manual control without requiring the operator to supply the load driving force. The force multiplication or magnification accomplished in the servomechanism may be adjusted by increasing or decreasing the stiffness of the leaf spring contacts or the pressure characteristics of the pressure sensitive resistor 40 or both.

In some applications of the servomechanism, particularly where high sensitivity is required, it is necessary to use a counterweight 54 to balance the weight of the pinion 31 and the arm 32. Alternatively, the pinion 31 may be journaled on the tail of the arm 32 so that it counterbalances the arm 32. If the arm 32 is balanced the only force required is that to overcome friction and the tension of the spring leafs contacts 46 and 47.

The vibration of the contacts serves another purpose, particularly when small forces are involved. The restoring spring effect of the contacts as affecting the position of the differential arms is proportional to the spring tension and the duration of contact. This spring effect may be made very small without decreasing the pressure required to maintain good electrical contact by shortening the duration of contact. Furthermore, the continual motion of the contacts makes them self-cleaning. The phasing of the contacts may, under certain conditions, be adjusted so that the contacts separate at the instant that the current flowing through them passes through zero. By breaking contact at a current zero the contacts may be separated without any sparking.

To secure maximum power impulses from the motor the shading coil circuits must be closed synchronously with the maximum of the alternating component of the exciting current. This means that the motor 49 must not only be synchronized as to speed but also synchronized as to phase.

This type of control may be applied to other motors such as split field universal, direct current, or repulsion besides the shaded pole variety. For example, a repulsion motor may have two sets of starting brushes, one set for each direction of rotation, and have intermittently operating contacts to short or connect together one or the other set of brushes. Since the torque in such a motor is determined by the flow of current through the connected brushes, the motor torque is controlled by varying the duration of contact.

Various modifications and arrangements of the motor control may be made without departing from the spirit and scope of the invention.

Having described my invention, I claim:

1. In a device of the class described, in combination, a motor having a first winding energized from a source of power, at least one auxiliary winding inductively energized from the first winding, said windings cooperating to produce a rotating magnetic field, a rectifier connected in series with the first field, a pressure sensitive resistance connected in parallel with the rectifier, and a pair of cyclically operating contacts in series with the auxiliary winding, said contacts being closed for a portion of each cycle that varies with the torque to be delivered by the motor, said pressure sensitive resistance being subjected to a pressure that varies as the speed to be developed by the motor.

2. In a device of the class described, in combination, a motor having a first winding energized from an alternating current source of power, auxiliary windings inductively energized from the first winding, a pair of contacts movable toward and away from each other and connected in series with the auxiliary windings, means operating in synchronism with the alternating current source for vibrating said contacts, said means being synchronized so that the maximum deflection of the vibrated contacts occurs in preselected phase relation with the alternating current source, and a member operatively connected to a device driven by the motor and electrically connected to the auxiliary windings interposed between the movable contacts for limiting the amplitude of vibration of the contacts and the amplitude of the current flow in the auxiliary windings according to the position of the member.

3. In a device of the class described, in combination, a member that is moved according to the error in position of a body, a motor for driving the body, said motor having a first winding energized from an alternating current source of power, a pair of auxiliary windings inductively energized from the first winding, leaf contacts cooperating with contacts on said member, means driven by the alternating current source for vibrating the leaf contacts, said means being synchronized so that the maximum deflection of the vibrated contacts occurs in preselected phase relation with the alternating current source, said member being oriented to move in a direction to vary the amplitude of vibration of the vibrated contacts, whereby said contacts close for a period of time the beginning and end of which vary symmetrically with respect to that phasing of the contacts at which the contacts are most effective in controlling the motor.

LAWRENCE S. WILLIAMS.

REFERENCES CITED

The following references are of record in the file of this patent:

UNITED STATES PATENTS

| Number | Name | Date |
| --- | --- | --- |
| 1,926,478 | Erwin | Sept. 12, 1933 |
| 2,106,030 | Junkins | Jan. 18, 1938 |
| 2,207,949 | Smith | July 16, 1940 |
| 2,285,578 | Gorrie | June 19, 1942 |
| 2,389,382 | Mikina | Nov. 20, 1945 |
| 2,390,547 | McCoy | Dec. 11, 1945 |
| 2,419,431 | Williams | Apr. 22, 1947 |